US009133407B2

(12) United States Patent
Koss et al.

(10) Patent No.: US 9,133,407 B2
(45) Date of Patent: Sep. 15, 2015

(54) SYSTEMS AND PROCESSES FOR REMOVING VOLATILE DEGRADATION PRODUCTS PRODUCED IN GAS PURIFICATION

(75) Inventors: Peter Ulrich Koss, Zollikon (CH); Stephen Alan Bedell, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 729 days.

(21) Appl. No.: 13/277,419

(22) Filed: Oct. 20, 2011

(65) Prior Publication Data

US 2012/0219482 A1 Aug. 30, 2012

Related U.S. Application Data

(60) Provisional application No. 61/446,641, filed on Feb. 25, 2011.

(51) Int. Cl.
*B01D 53/40* (2006.01)
*B01D 53/75* (2006.01)
(Continued)

(52) U.S. Cl.
CPC .............. *C10L 3/103* (2013.01); *B01D 53/1406* (2013.01); *B01D 53/1425* (2013.01); *B01D 53/1456* (2013.01); *B01D 53/1475* (2013.01); *B01D 53/1487* (2013.01); *C10L 3/104* (2013.01); *B01D 2251/10* (2013.01); *B01D 2251/506* (2013.01); *B01D 2251/508* (2013.01); *B01D 2252/103* (2013.01); *B01D 2252/204* (2013.01); *B01D 2256/24* (2013.01); *B01D 2257/304* (2013.01); *B01D 2257/306* (2013.01); *B01D 2257/308* (2013.01); *B01D 2257/40* (2013.01); *B01D 2257/406* (2013.01); *B01D 2257/504* (2013.01); *B01D 2257/704* (2013.01); *B01D 2257/708* (2013.01); *B01D 2258/0283* (2013.01)

(58) Field of Classification Search
None
See application file for complete search history.

(56) References Cited

U.S. PATENT DOCUMENTS 2,487,576 A   11/1949  Meyers
2,608,461 A    8/1952  Frazier
(Continued)

FOREIGN PATENT DOCUMENTS

EP    0 502 596    9/1992
EP    0 798 029    10/1997
(Continued)

OTHER PUBLICATIONS

The International Search Report and the Written Opinion of the International Searching Authority for PCT/US2012/025990 dated May 21, 2012.

*Primary Examiner* — Stuart Hendrickson
*Assistant Examiner* — Daniel Berns
(74) *Attorney, Agent, or Firm* — Cynthia W. Flanigan

(57) ABSTRACT

Systems and process for volatile degradation removal from amine plant wash water are provided. The systems and processes include a separation device disposed within a water circulation loop and configured to continuously remove at least a portion of the volatile degradation products from the wash solutions. The separation device can be configured for stripping, distillation, and/or extraction of the volatile degradation products from at least a fraction of the spent wash water. Optionally, a chemical agent can be reacted with the volatile degradation products to form heat stable salts for subsequent removal.

11 Claims, 4 Drawing Sheets

(51) Int. Cl.
*B01D 53/78* (2006.01)
*B01D 53/96* (2006.01)
*B01D 53/14* (2006.01)
*B01D 53/50* (2006.01)
*B01D 53/62* (2006.01)
*B01D 53/54* (2006.01)
*B01D 53/58* (2006.01)
*B01D 53/72* (2006.01)
*C10L 3/10* (2006.01)

(56) References Cited

U.S. PATENT DOCUMENTS

| | | | |
|---|---|---|---|
| 3,255,233 | A | 6/1966 | Kunze et al. |
| 3,563,696 | A | 2/1971 | Benson |
| 3,896,212 | A | 7/1975 | Ecikmeyer |
| 5,318,758 | A | 6/1994 | Fujii et al. |
| 5,344,627 | A | 9/1994 | Fujii et al. |
| 5,378,442 | A | 1/1995 | Fujii et al. |
| 5,618,506 | A | 4/1997 | Suzuki et al. |
| 6,117,404 | A | 9/2000 | Mimura et al. |
| 6,423,282 | B1 | 7/2002 | Araki et al. |
| 6,485,547 | B1 | 11/2002 | Iijima |
| 6,645,446 | B1 | 11/2003 | Won et al. |
| 6,764,530 | B2 | 7/2004 | Iijima |
| 6,800,120 | B1 | 10/2004 | Won et al. |
| 6,883,327 | B2 | 4/2005 | Iijima et al. |
| 7,056,482 | B2 | 6/2006 | Hakka et al. |
| 7,316,737 | B2 | 1/2008 | Mimura et al. |
| 7,377,967 | B2 | 5/2008 | Reddy et al. |
| 2004/0092774 | A1 | 5/2004 | Mimura et al. |
| 2004/0226441 | A1 | 11/2004 | Palmer |
| 2006/0204425 | A1 | 9/2006 | Kamijo et al. |
| 2006/0248890 | A1 | 11/2006 | Iijima et al. |
| 2008/0056972 | A1 | 3/2008 | Iijima |
| 2008/0072762 | A1 | 3/2008 | Gal |
| 2008/0223215 | A1 | 9/2008 | Iijima et al. |
| 2009/0068078 | A1 | 3/2009 | Grobys et al. |
| 2009/0282977 | A1 | 11/2009 | Koss |
| 2009/0305870 | A1 | 12/2009 | Chung |
| 2010/0003177 | A1 | 1/2010 | Aroonwilas et al. |
| 2010/0005722 | A1 | 1/2010 | Iijima et al. |
| 2010/0050637 | A1 | 3/2010 | Yamashita et al. |
| 2010/0083831 | A1 | 4/2010 | Gal et al. |
| 2010/0258005 | A1 | 10/2010 | Oishi et al. |
| 2010/0326074 | A1 | 12/2010 | Okita et al. |
| 2011/0033359 | A1 | 2/2011 | Papenheim et al. |

FOREIGN PATENT DOCUMENTS

| | | |
|---|---|---|
| EP | 0 879 631 | 5/2002 |
| EP | 1 695 756 | 8/2006 |
| EP | 2 085 133 | 8/2009 |
| EP | 2 228 119 | 9/2010 |
| EP | 2 258 461 | 12/2010 |
| EP | 2 269 711 | 1/2011 |
| EP | 2 269 712 | 1/2011 |
| EP | 2 269 713 | 1/2011 |
| EP | 2 286 894 | 2/2011 |
| FR | 2 897 785 | 8/2007 |
| FR | 2 938 454 | 2/2010 |
| GB | 871207 | 6/1961 |
| JP | 2009214089 | 9/2009 |
| JP | 2009215186 | 9/2009 |
| WO | WO 02/09849 | 2/2002 |
| WO | WO 03/013699 | 2/2003 |
| WO | WO 2004/005818 | 1/2004 |
| WO | WO 2005/069965 | 8/2005 |
| WO | WO 2007/009461 | 1/2007 |
| WO | WO 2007/019632 | 2/2007 |
| WO | WO 2007/068733 | 6/2007 |
| WO | WO 2007/107004 | 9/2007 |
| WO | WO 2008/094777 | 8/2008 |
| WO | WO 2009/003238 | 1/2009 |
| WO | WO 2009/004307 | 1/2009 |
| WO | WO 2009/035340 | 3/2009 |
| WO | WO 2009/065218 | 4/2009 |
| WO | WO 2009/104744 | 8/2009 |
| WO | WO 2009/112518 | 9/2009 |
| WO | WO 2009/138363 | 11/2009 |
| WO | WO 2010/010720 | 1/2010 |
| WO | WO 2010/051604 | 5/2010 |
| WO | WO 2010/102877 | 9/2010 |
| WO | WO 2010/105754 | 9/2010 |
| WO | WO 2010/113364 | 10/2010 |
| WO | WO 2010/122830 | 10/2010 |
| WO | WO 2010/133484 | 11/2010 |
| WO | WO 2010/142716 | 12/2010 |

SYSTEMS AND PROCESSES FOR REMOVING VOLATILE DEGRADATION PRODUCTS PRODUCED IN GAS PURIFICATION

BACKGROUND

The present disclosure generally relates to liquid absorption systems and methods for removal of contaminants from gas streams such as flue gas.

Power plants may combust various fuels, such as coal, hydrocarbons, bio-mass, waste products, and the like, in boilers, for example, to generate steam and electricity. Exhaust streams (e.g., flue gas) of such combustion processes are often treated to neutralize or remove various compounds, such as carbon dioxide, sulfur oxides, nitrogen oxides, and particulate matter, prior to discharge of the flue gas to the environment. These downstream processes include, among others, post-combustion capture systems.

In post-combustion processes used for industrial separation of acidic components such as $H_2S$, $CO_2$, COS and/or mercaptans from a gas stream such as flue gas, natural gas, syngas or other gas streams mainly containing nitrogen, oxygen, hydrogen, carbon monoxide and/or methane, liquid solutions comprising amine compounds or aqueous ammonia solutions are commonly used as a wash solution. The acidic components are absorbed in the amine based wash solution in an absorption process. This process may be generally referred to as the main scrubbing process.

In the amine based absorption processes, water soluble contaminants such as ammonia, acetone, formaldehyde, other aldehydes, amine compounds, degradation products of amine compounds, nitrosamines, or combinations thereof can be formed and transferred to the gas stream. In some systems, these contaminants are subsequently removed along with the acidic components during regeneration. In other systems, these water soluble contaminants remain soluble in the water and are not removed. As a result, these water soluble contaminants can deleteriously increase in concentration and, in some cases, create a saturated solution, thereby forming precipitates that can lead to blockages within the conduits or may become exhausted through the stack.

In Prior Art FIG. 1, a typical liquid absorption system for removing carbon dioxide and contaminants from a gas stream generally includes an absorption unit 101 arranged to allow contact between the gas stream to be purified and one or more wash liquids. The absorption unit represented in FIG. 1 includes a $CO_2$ absorption section 102 and a water wash section 103. In some systems, these sections are a packed bed column. Flue gas, from which $CO_2$ and contaminants are to be removed, is fed to the absorption unit 101 via line 104.

In the $CO_2$ absorption section 102, the flue gas is contacted with a first wash liquid comprising an amine compound, e.g., by bubbling the flue gas through the first wash liquid or by spraying the first wash liquid into the flue gas. The first wash liquid can be fed to the absorption unit via line 105. Exemplary amine compounds include, without limitation, monoethanolamine (MEA), diethanolamine (DEA), methyldiethanolamine (MDEA), diisopropylamine (DIPA), and aminoethoxyethanol (diglycolamine), and combinations thereof. The amine based wash solution may further include a promoter and/or an inhibitor. The promoters are generally utilized to enhance the reaction kinetics involved in the capture of $CO_2$. Exemplary promoters include an amine such as piperazine or enzymes such as carbonic anhydrase or its analogs. The promoters may be in the form of a solution or immobilized on solid or semisolid surfaces. Inhibitors are generally provided to minimize corrosion and solvent degradation. In the $CO_2$ absorption section 102, $CO_2$ from the flue gas is absorbed in the first wash liquid.

The flue gas depleted of $CO_2$ then enters the water wash section 103 of the absorption unit 101, wherein the water wash section 103 is arranged to allow contact between the flue gas and a second wash liquid, which is generally water. The second wash liquid is fed to the absorption unit via line 106. In the water wash section 103, contaminants remaining in the flue gas when it leaves the $CO_2$ absorption section are absorbed. The contaminants can include the water soluble volatile degradation products such as ammonia, formaldehyde, degradation products of amine, nitrosamines, combinations thereof, and the like. The flue gas, which is now depleted of $CO_2$ and contaminants, leaves the absorption unit via line 107 and is typically discharged into the environment. Optionally, the treated flue gas depleted of $CO_2$ and contaminants may undergo further processing, e.g., particulate removal (not shown), prior to being released to the environment.

Traditionally, the spent wash water from the water wash section is simply drained to the main $CO_2$ removal step, where it mixes with the amine solution and leaves the absorption unit via line 108. The spent wash liquid (amine and water) may then be recycled via a regenerator unit 109, wherein contaminants and $CO_2$ contained therein are thermally separated from the used wash liquid. The separated $CO_2$ leaving the regenerator 109 may be compressed via line 110. For ease of transport, the $CO_2$ may be compressed to the order of 100 atm.

In the regenerator 109, the amine content in the wash is recovered and because the temperature within the regenerator is elevated throughout (e.g., as high as 100 to 150° C.), any volatile degradation products can be stripped off from the amine-rich solution together with the acid gases, e.g., $CO_2$, $H_2S$, and the like. As a result, the regenerator produces a regenerator overhead product 114 that generally includes the acid gases, the volatile degradation products plus a major fraction of water vapor. Depending on the solubility and on the process design (e.g., temperatures, pressure, etc.) of the regenerator overhead condensing and post treatment system, these contaminants will either leave the system with the acid gas or are solved in the aqueous condensate generated in the condenser 112 or overhead system. As a result, the amount of contaminants can be kept relatively low. Also, since amine degradation is minimal in these types of system, the formation of volatile degradation products is equally low. However, in advanced amine based systems, which are generally adapted to the application for $CO_2$ capture from low pressure flue gases, amine degradation is significantly higher leading to the production of higher amounts of volatile degradation products. Moreover, as will be discussed below, the absorption and regeneration units are of a significantly different design, which affects handling of the volatile degradation products.

FIG. 2 schematically illustrates a prior art amine based system for treating low pressure flue gas. Generally, a high water consumption and/or production of an aqueous emission are not desirable in a post combustion system. As such, the design of these advanced systems is to provide a neutral water balance, meaning that the amount of water vapor entering the plant via the flue gas is the same amount of water vapor leaving the water wash with the stack gas stack such that the water inventory of the whole system stays constant. In such as design, the wash water utilized in the water wash is generated self sufficient by condensing a part of the water vapor contained in the treated gas as coming from the main $CO_2$ absorption.

The system generally includes an absorption unit 201 arranged to allow contact between a gas stream to be purified and one or more wash liquids. The absorption unit comprises an amine wash section 202 for $CO_2$ absorption and a water wash section 203 for contaminant removal. Intermediate sections 202 and 203 is a condenser 212.

Flue gas from which $CO_2$ is to be removed is first fed to the absorption unit 201 via line 204. In section 202, the flue gas is contacted with a wash liquid comprising an amine compound, e.g., by bubbling the flue gas through said wash liquid or by spraying the wash liquid into the flue gas. The amine wash liquid is fed to the absorption unit via line 205. $CO_2$ from the flue gas is absorbed in the amine wash liquid. Flue gas depleted of $CO_2$ in the $CO_2$ absorption section 202 then enters the water wash section 203, wherein the flue gas contacts a second wash liquid, which is generally water, for removing contaminants from the flue gas. The second wash liquid is fed to the absorption unit via line 216.

As shown, the wash water utilized in wash water section 203 is generated self sufficient by condensing part of the water vapor contained in the treated gas coming from the $CO_2$ absorption section 202. Excess water is not discharged as an effluent but instead is sent to the amine wash solution loop via line 214. Flue gas depleted of $CO_2$ and contaminants leaves the absorption unit via line 207. The used first and second wash liquids containing absorbed $CO_2$ and contaminants leave the absorption unit via line 208.

The used first and second wash liquids may be recycled via a regenerator unit 209, wherein the acid gases such as $CO_2$ are separated from the wash liquids. A portion of the used wash liquids can be heated via heat exchanger 215 and fed to a mid-section of the regenerator (e.g., typically 100 to 150° C.) via line 218 or fed to the top portion of the regenerator unit 209 via line 220, which is at a markedly lower temperature so as to minimize the energy losses due to the latent heat of the water vapor (e.g., typically 40 to 60° C.). The regenerated wash solution is withdrawn from the lower section 222 and provided to a reboiler 230 positioned downstream of the regenerator and arranged to receive the regenerated wash solution. The separated $CO_2$ leaves the system via line 210.

The reboiler 230 boils the regenerated wash solution to form steam 232 and a hot regenerated wash solution (amine lean) 234. The hot regenerated wash solution 234 is provided to the absorber unit 201 for removal of gaseous contaminants from the gas stream 204. The hot regenerated solution 234 may be provided directly to the absorber unit 201 for re-use. However, to take advantage of the thermal energy present, the hot regenerated wash solution is provided to heat exchanger 215, where it exchanges heat with the used wash solution 205.

In such designs, because of the temperature profile within the regenerator (i.e., cooler at the top portion, hotter at the bottom portion so as to reduce energy consumption), the volatile degradation products will not leave the regeneration system with the $CO_2$ but rather remain dissolved in the amine solutions where they could build up to undesirably high concentrations. As a result, the volatile degradation products accumulate during cycling between the amine solution and the wash water. The volatile degradation products can then undesirably break through the stack or form solid depositions within the conduits of the system, e.g., ammonia may form ammonium bicarbonate or carbonate. As such, the newer systems are prone to the wash water failing to achieve the desired removal of the water soluble volatile degradation products or that blockages may occur due to buildup of solid depositions resulting from the accumulation and saturation of the volatile degradation products.

Accordingly, there is a need for volatile degradation product removal from amine plant wash water especially as it relates to designs where the only removal of the degradation products are through volatilization and discharge with the $CO_2$.

BRIEF SUMMARY

Disclosed herein are gas purification processes and systems for removing contaminants from a gas stream such as a flue gas. In one embodiment, a process for removal of gaseous contaminants from a gas stream comprises contacting the gas stream with an amine-based wash solution to remove gaseous acidic components from the gas stream by absorption into the amine-based wash solution to form a first spent wash solution; and contacting the gas stream with one or more aqueous wash solutions to remove water soluble contaminants and form an additional spent wash solution, wherein at least a portion of the additional spent wash solution is fed to a separation device for separating and removing the water soluble contaminants from the portion of the additional spent wash solution.

A gas purification system for removal of gaseous contaminants from a gas stream comprises an absorption unit comprising at least one amine based wash solution section configured to receive the gas stream comprising the acidic components to be removed, and at least one water wash section downstream from the at least one amine based wash solution section relative to a flow of the gas stream through the absorption unit, wherein the at least one water wash section is configured to receive the gas stream from the amine based wash solution section, wherein the gas stream comprises water soluble contaminants generated in the amine based wash solution section and the at least one water wash section is configured to remove the water soluble contaminants from the gas stream; and a water recirculation loop in fluid communication with the at least one wash water section and configured to receive spent water wash solution including the water soluble contaminants therein from the at least one water wash section, the water recirculation loop comprising a separation device for continuously removing at least a portion of the water soluble volatile contaminants from the spent wash solution.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Disclosed herein are systems and processes for treating water soluble volatile degradation products that can be produced during gas purification processes such as, but not limited to, traces of ammonia, acetone, formaldehyde, other aldehydes, amine compounds, degradation products of amine compounds, nitrosamines, or various combinations thereof. As will be discussed in greater detail below, the systems and processes described herein provide for removal of these water soluble volatile degradation products via a separation device disposed in the wash water circulation loop of the absorption unit so as to continuously remove at least a portion of the volatile degradation products from the system, thereby maintaining low levels of volatile degradation products in the system, i.e., the concentration of the water soluble volatile degradation products dissolved in the wash water and the amine solution can be kept low so as to ensure the wash water functions as intended and also prevent undesirable formation of solid depositions caused by high concentrations of volatile degradation products. The separation device can function by distillation, stripping, and/or extraction as may be desired for different applications. Optionally, a chemical agent such as an oxidizing agent, acid, or the like can be introduced in the separation device or at other locations within the system to contact the volatile degradation products and form heat stable salts that can be readily removed from the system.

Figure 1:
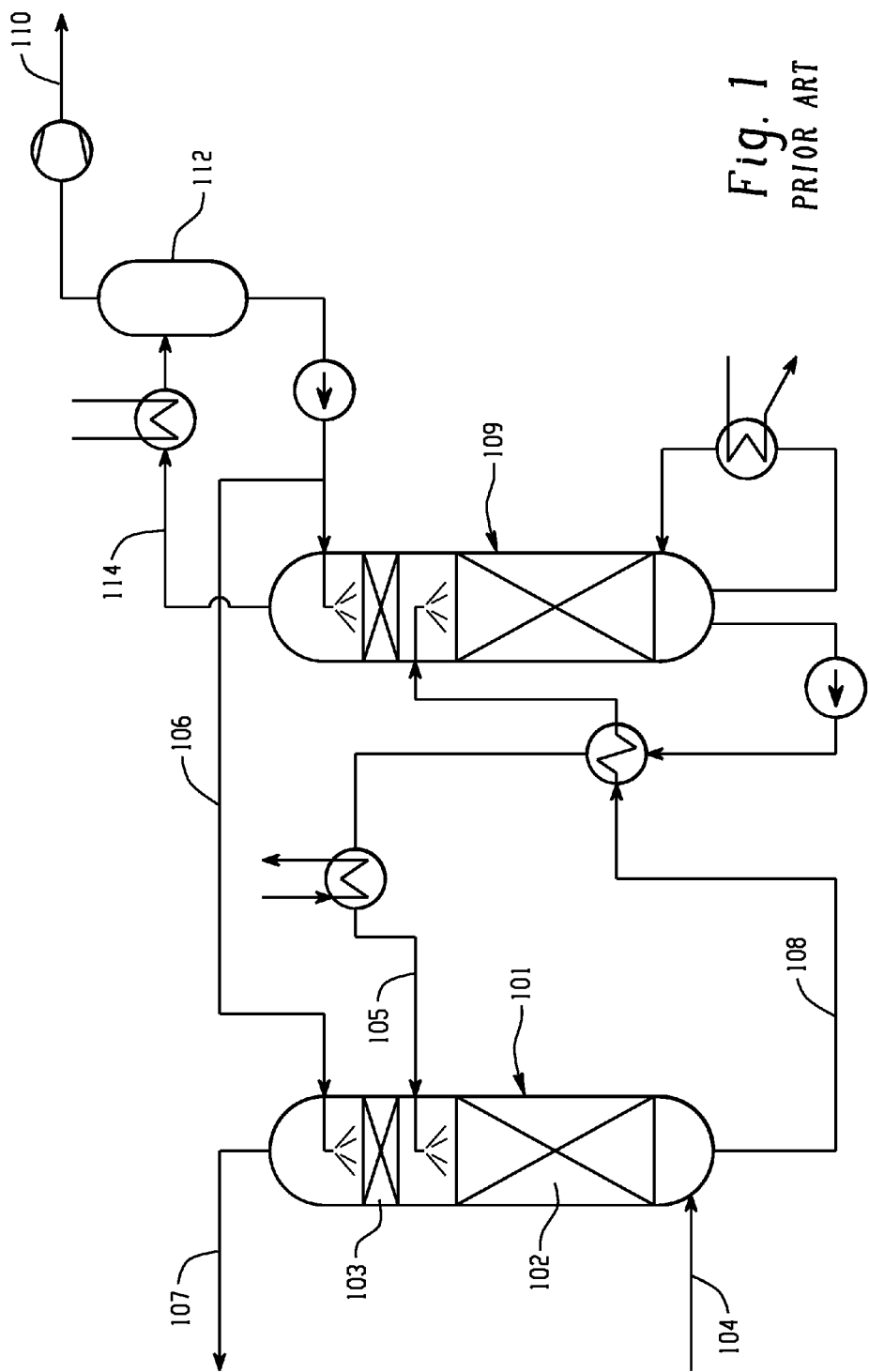
FIG. 1 is a prior art diagram depicting a known amine based gas purification system.
Figure 2:
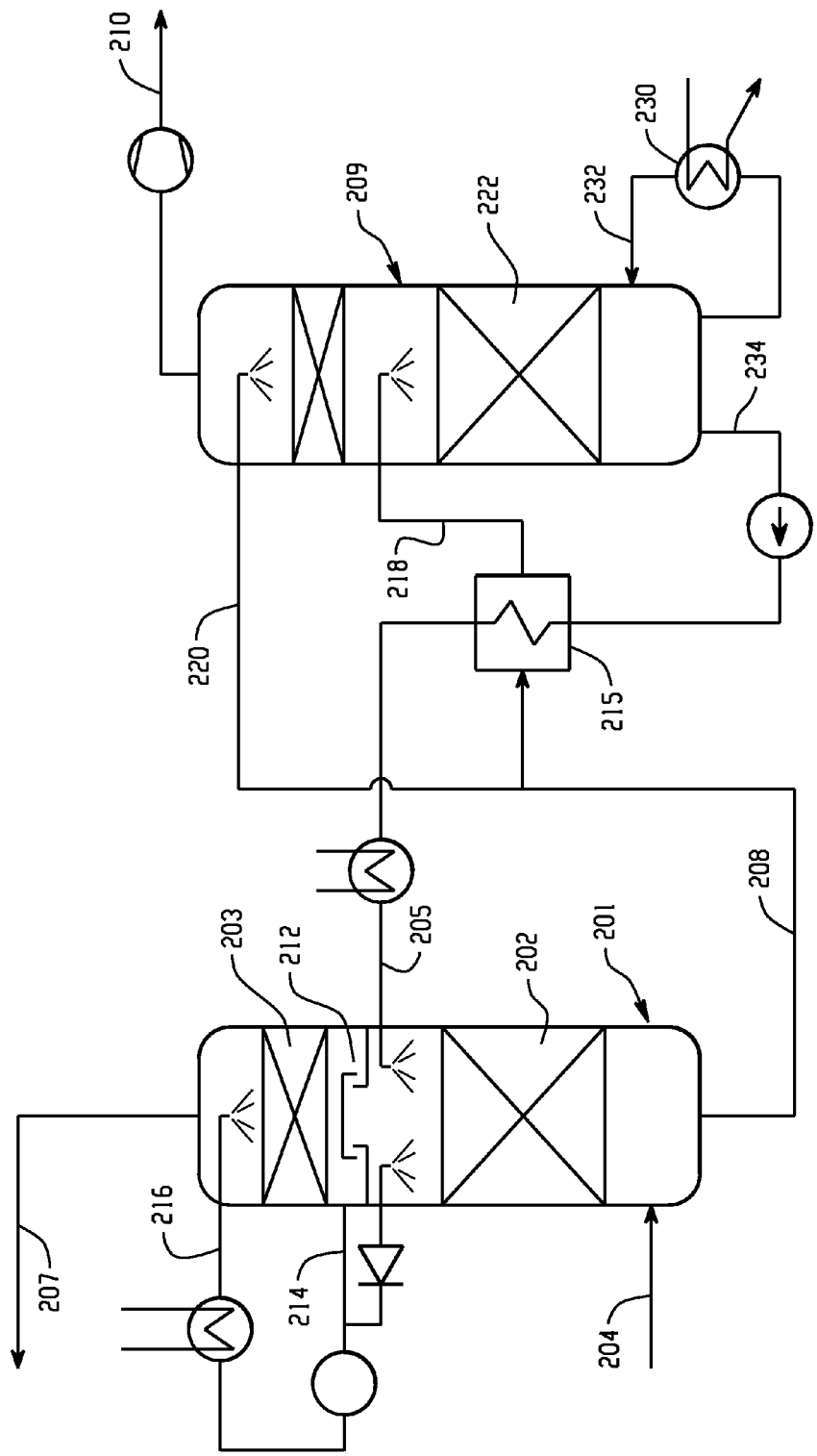
FIG. 2 is a prior art diagram depicting a known advanced amine based gas purification system.
Figure 3:
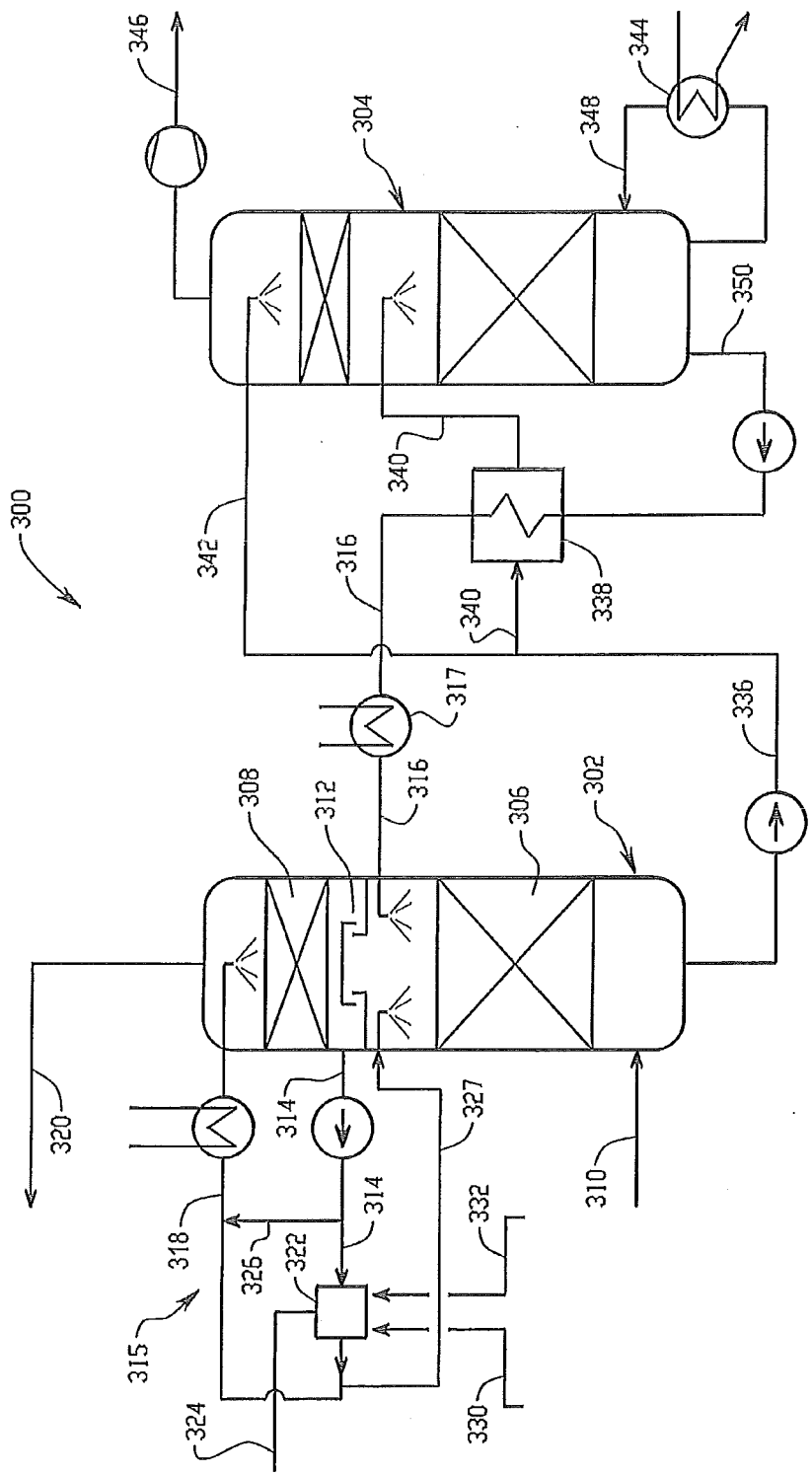
FIG. 3 is a diagram generally depicting an embodiment of an amine based gas purification system according to the present invention.

Referring now to FIG. 3, there is an exemplary liquid absorption system for treating a gas stream including a separation device disposed in the water wash circulation loop. The system, generally designated by reference numeral 300, generally includes an absorption unit 302 and a regeneration unit 304. The absorption and regeneration units 302, 304 may be a column such as a packed bed column or a column containing trays. The absorption unit 302 includes at least one $CO_2$ absorption section 306 (also referred to herein as the amine based wash solution section) and at least one water wash solution section 308. Intermediate the $CO_2$ absorption section 306 and the water wash solution section 308 is a condenser 312 such that excess water vapor entrained in the flue gas is condensed and removed via line 314 of a water wash circulation loop 315 in fluid communication with the water wash section 308.

Flue gas enters the absorption unit 302 via line 310, wherein $CO_2$ is absorbed in the $CO_2$ absorption section 306. In $CO_2$ absorption section 306, the flue gas is contacted with a wash liquid comprising an amine compound, e.g., by bubbling the flue gas through the amine based wash liquid or by spraying the amine based wash liquid into the flue gas. The amine based wash liquid is fed to the absorption unit 302 via line 316.

Flue gas depleted of $CO_2$ in the $CO_2$ absorption section 306 then enters the water wash section 308 of the absorption unit 302, wherein the water wash section 308 is arranged to allow contact between the flue gas depleted of $CO_2$ and a water based liquid. The water based liquid is fed to the absorption unit via line 318. In the water wash section, water soluble contaminants such as the water soluble volatile degradation products remaining in the flue gas when it leaves the $CO_2$ absorption section are absorbed in the water wash liquid. The excess spent water is discharged via line 314 whereas the flue gas depleted of $CO_2$ and contaminants can then leave the stack via line 320 or may be further processed depending on the system.

In the water wash section 308, all or a fraction of the excess spent water (i.e., water that now includes the water soluble contaminants) is provided to separation unit 322. If only a fraction is treated, the remaining portion of the spent wash solution may be diverted to line 318 via line 326 for recirculation into the wash water section 308 of the absorption unit 302. In the separation device 322, the fraction of spent wash water is treated so as to remove the water soluble contaminants contained therein. The treated wash water after removal of the volatile degradation products is discharged from the separation unit 322 and may be recycled to the water wash section 308 via line 318 or may be provided to $CO_2$ absorption section 306 via line 327.

The spent wash solutions containing the gaseous contaminants, e.g., the acid gases such as $CO_2$, and a portion of the total volatile degradation products in the system are recycled to the regenerator unit 304 via line 336. The spent wash solution can be heated via heat exchanger 338 via line 340 and fed to a mid-section of the regenerator typically at a temperature of about 100 to about 150° C. or fed to the top portion of the regenerator unit 304 via line 342, which is at a markedly lower temperature so as to minimize the energy losses due to the latent heat of the water vapor (e.g., typically a temperature of about 40 to about 60° C.). The separated $CO_2$ leaves the system via line 346.

The wash solution is withdrawn from the lower section of the regenerator and provided to a reboiler 344 positioned downstream of the regenerator and arranged to receive the unit wash solution. The reboiler 344 boils the wash solution to form steam 348 and a hot wash solution (amine lean) 350. The hot regenerated solution 350 is provided to heat exchanger 338, where it exchanges heat with the used wash solution 340 being directed to the regenerator unit 304 from the absorption unit 302. Heat-exchanging allows for heat transfer between the solutions, resulting in a cooled reboiled wash solution in line 316 and a heated used wash solution in line 340. The reboiled and heat-exchanged wash solution is thereafter passed to the next round of absorption in the absorber via line 316 for removal of gaseous contaminants from the gas stream 310. Before being fed to the absorption unit 302, the wash solution may be further cooled to a temperature suitable for absorption. Accordingly, a cooler 317 may be arranged near the absorber solvent inlet.

Within the separation unit 322, the volatile degradation products are removed by stripping, distillation, and/or extraction as may be desired for different configurations. Still further, a chemical agent such as an oxidizing agent, acid, and the like can be injected into the separation device, in the water circulation loop, or elsewhere such that the chemical agent contacts the volatile degradation product to form a heat stable salt. By way of example, an aqueous sulfite or bisulfite solution may be added. The mediums utilized in stripping, extraction, and the like as well as the chemical agents can be introduced to the separation device 322 via lines 330, 332. For example, spent wash water can be treated with an acidifying agent such as $H_2SO_4$, $H_2SO_3$, and the like via line 330 or at other locations within the system to form the heat stable salt so that it can be more easily separated from the spent wash water. Alternatively, in place of a liquid stream containing an acidifying agent, a gaseous stream can be used such as, for example, a gaseous stream containing an acid gas such as $CO_2$, $SO_2$, $SO_3$ and the like. Likewise, the stripping medium or extraction medium can be provided via line 332. Once treated in the separation device 322, the volatile degradation products are removed via line 324 and the treated wash water without the volatile degradation products provided to line 318 for recirculation into the wash water section 308 or line 327 for use in the $CO_2$ absorption section 306. In this manner, at least a portion of the volatile degradation products can be continuously removed from the spent wash water, thereby preventing deleterious buildup of high concentrations.

In one embodiment, the excess water via line 326 is routed though the separation device and stripping is utilized, wherein the stripping process may be enhanced by introducing a basic chemical such as ammonia via the amine solution from the main loop or caustic provided that these materials do not create additional problems.

Figure 4:
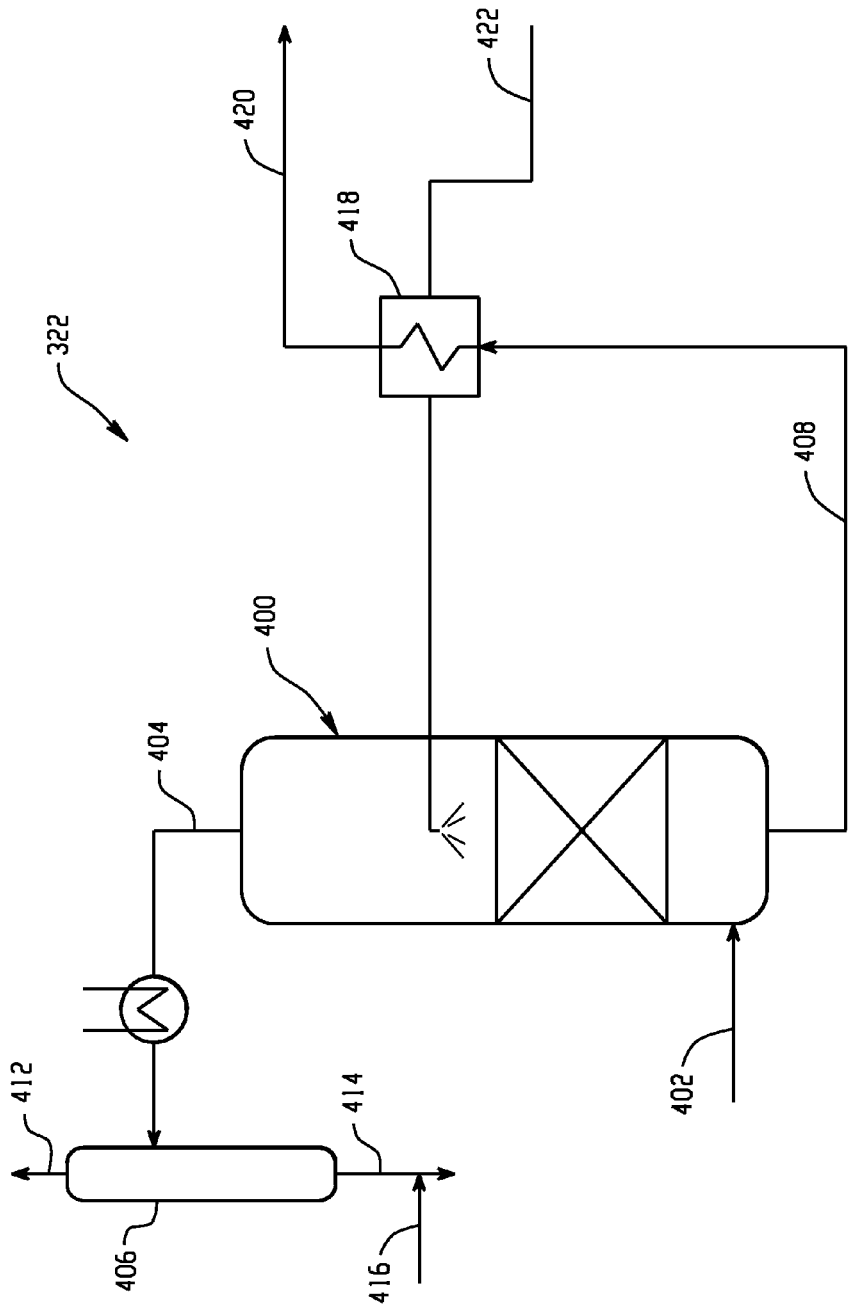
FIG. 4 is a diagram generally depicting an embodiment of an amine based gas purification system according to the present invention.

FIG. 4 provides an exemplary schematic of a separation device 400 configured for stripping. As a stripping medium, a heated gas may be used. For example, warm or hot flue gas, steam or other gas can be used. Alternatively, stripping can be live steam generated at the bottom of the stripper such as in a reboiler mounted at the bottom of the stripper. In the illustrated exemplary embodiment, hot flue gas is introduced to the stripper via line 402 and is mixed with spent wash water containing the volatile degradation products. The hot flue gas may be extracted at a location upstream of the $CO_2$ capture unit and volatilizes the water soluble volatile degradation products from the spent wash water. The vapors leaving the stripper 400 via line 404 can be fed to a condenser 406 such that the contained water is condensed. The resulting amount of condensate will be relatively small as compared to the volume of water within the circulation loop and will contain the major fraction and high concentration of volatile degradation products, which are soluble in water, such that it can be sent via line 414 to an appropriate location such as the battery limits for work-up or disposal, e.g., by incineration.

The hot treated water is provided to a heat exchanger 418 via line 408 where it can be recirculated into the water circulation loop via line 420 and heat transferred to the stripper wash of line 422.

Depending on the composition and the volatile degradation products content of the stream leaving the condenser via line 412 in the gaseous phase, this gaseous phase may be mixed with the flue gas at an appropriate location in the flue gas train, i.e., at a location within the flue gas train, at a location within the absorption unit, or even to the stack gas, or alternatively sent back to the boiler of the power plant for incineration.

Optionally, it may be advantageous to treat the condensate discharged from the stripper via line 414 with an appropriate chemical agent introduced via line 416 to ease the further processing, e.g., by neutralization with a liquid stream containing an acidifying agent such as $H_2SO_4$, $H_2SO_3$, and the like or a gaseous stream containing an acidic gas such as $CO_2$, $SO_2$, $SO_3$, and the like.

Advantageously, the present invention overcomes the problems noted in the prior art in the newer designs that do not include a regenerator having a temperature profile conducive for removing the volatile degradation products. Moreover, the concentration of the volatile degradation products dissolved in the wash water and the amine solution can be maintained at a relatively low level so as to avoid blockages as well as insure the wash water works properly.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process for removal of gaseous contaminants from a gas stream, the process comprising:
    contacting the gas stream with an amine-based wash solution to remove gaseous acidic components from the gas stream by absorption into the amine-based wash solution to form a first spent wash solution and a gas stream depleted of acidic components; and
    contacting the gas stream depleted of acidic components with one or more aqueous wash solutions to remove water soluble contaminants and form a second spent wash solution and a gas stream depleted of acidic components and water soluble contaminants, wherein at least a portion of the second spent wash solution is fed to a separation device for separating and removing the water soluble contaminants from the portion of the second spent wash solution;
    wherein after removal of the water soluble contaminants, the treated second spent wash solution is recirculated with the amine-based wash solution and/or the aqueous wash solution; and
    regenerating the first and second spent wash solutions in a regeneration unit to form a regenerated wash solution and a gas stream of the acidic components, wherein the regeneration unit has a temperature profile and configuration such that the water soluble contaminants remain in the regenerated wash solution.

2. The process of claim 1, wherein the gas stream is a natural gas stream or a flue gas stream.

3. The process of claim 1, wherein the acidic component is $CO_2$.

4. The process of claim 1, further comprising contacting a chemical agent with the second spent wash solution to form heat stable salts of the water soluble contaminants.

5. The process of claim 4, wherein the chemical agent is introduced into the separation device.

6. The process of claim 4, wherein the chemical agent is introduced into a water circulation loop configured for contacting the gas stream depleted of acidic components with the aqueous wash solution.

7. The process of claim 4, wherein the chemical agent comprises an aqueous sulfite or bisulfite solution.

8. The process of claim 1, further comprising acidifying the second spent wash solution.

9. The process of claim 8, wherein acidifying the second spent wash solution, comprises contacting the second spent wash solution with a gaseous stream containing $CO_2$, $SO_2$, $SO_3$ or mixtures thereof, or a liquid stream containing $H_2SO_4$, $H_2SO_3$ or mixtures thereof to form a heat stable salt of the water soluble contaminants.

10. The process of claim 1, wherein the separation device is configured to strip, distill and/or extract the water soluble contaminants from the second spent wash solution.

11. The process of claim 1, wherein the water soluble contaminants comprise ammonia, acetone, formaldehyde and other aldehydes, amine compounds, degradation products of amine compounds, nitrosamines and combinations thereof.

* * * * *